US010558611B2

(12) United States Patent
Hildebrand et al.

(10) Patent No.: US 10,558,611 B2
(45) Date of Patent: Feb. 11, 2020

(54) FORMAT AWARE FILE SYSTEM WITH FILE-TO-OBJECT DECOMPOSITION

(71) Applicant: International Business Machines Corporation, Armonk, NY (US)

(72) Inventors: Dean Hildebrand, Bellingham, WA (US); Vasily Tarasov, Port Jefferson Station, NY (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 15/253,108

(22) Filed: Aug. 31, 2016

(65) Prior Publication Data

US 2018/0060336 A1 Mar. 1, 2018

(51) Int. Cl.
*G06F 16/00* (2019.01)
*G06F 16/11* (2019.01)

(52) U.S. Cl.
CPC .................................. *G06F 16/11* (2019.01)

(58) Field of Classification Search
None
See application file for complete search history.

(56) References Cited

U.S. PATENT DOCUMENTS

| | | | |
|---|---|---|---|
| 7,380,205 B2 | 5/2008 | Bezrukov et al. | |
| 9,110,907 B2 | 8/2015 | Shazly | |
| 9,158,778 B2 | 10/2015 | Isaacson et al. | |
| 9,355,109 B2 | 5/2016 | Archak et al. | |
| 9,800,656 B2 | 10/2017 | Vallabhaneni et al. | |
| 2009/0043831 A1 | 2/2009 | Antonopoulos et al. | |
| 2011/0231631 A1* | 9/2011 | Matsuzawa | G06F 3/0607 711/209 |
| 2011/0289287 A1* | 11/2011 | Yamamoto | G06F 3/0605 711/156 |
| 2012/0011329 A1* | 1/2012 | Nonaka | G06F 3/0604 711/154 |
| 2012/0054407 A1* | 3/2012 | Hayashi | G06F 3/0605 711/4 |
| 2012/0079192 A1* | 3/2012 | Jaquette | G06F 3/0608 711/114 |
| 2012/0278295 A1 | 11/2012 | Hildebrand et al. | |

(Continued)

OTHER PUBLICATIONS

Valduriez et al., "Implementation Techniques of Complex Objects," Proc. of the 12th Int'l. Conf. on Very Large Data Bases, pp. 101-110, Aug. 1986.

(Continued)

*Primary Examiner* — Bai D Vu
(74) *Attorney, Agent, or Firm* — Lieberman & Brandsdorfer, LLC

(57) ABSTRACT

Embodiments relate to a computer system, computer program product, and method to process complex files, and specifically, to support read and write requests of a multi-object file. Upon receipt of a file, a computer system parses the file into two or more logical objects. Each logical object has an associated or inherent characteristic. Each of the logical objects is matched to a storage tier in a multi-tier storage array. Each logical object is then assigned to a tier based on one or more object characteristics in the matched storage tier, and stored in a decomposed format. In addition, an identification of each logical object, and the object assignment, is recorded in an index.

20 Claims, 12 Drawing Sheets

(56) References Cited

U.S. PATENT DOCUMENTS

2014/0358863 A1\* 12/2014 Bennett ................ G06F 16/113
  707/665
2016/0070741 A1   3/2016 Lin et al.

OTHER PUBLICATIONS

Hardy & Schwartz, "Essence: A Resource Discovery System Based on Semantic File Indexing," 1993 Winter USENIX, Jan. 1993, pp. 361-374.
Kim, Ted Hoon, "Frigate: An Object-Oriented File System," Dissertation, University of California, Los Angeles, 1998.
Tarasov, V. et al., "Improving I/O Performance Using Virtual Disk Introspection," Proceedings of the 5th USENIX Conference on Hot Topics in Storage and File Systems, USENIX 2013.

\* cited by examiner

FORMAT AWARE FILE SYSTEM WITH FILE-TO-OBJECT DECOMPOSITION

BACKGROUND

The present embodiments relate to complex file structures, and associated file storage. More specifically, the embodiments relate to utilizing the complexity of a storage array together with decomposition of complex files to manage the files.

A computer file is a self-contained piece of information available to an operating system and a computer program. The file is a collection of data or information. Different types of files store different types of information. Conventionally, files have been known to include a raw sequence of bytes, characters, or records interpreted solely by a user application. An associated traditional file system views these files as raw byte sequences and splits the files into blocks or extents which are then stored in an underlying storage device. However, from a user's and application's point of view files can be considered as containers of smaller logical objects.

Recently, file formats have grown in complexity. Examples of these complex formats include, but are not limited to, compressed and uncompressed archives, compressed sets of assorted objects, tables, indexes, and integrated video and audio streams. The majority of modern files can be considered as containers of smaller logical objects, as opposed to a single homogeneous stream of bytes. These internal objects exhibit diverse properties, access patterns, and performance requirements. At the same time, traditional file systems do not look inside the files to address these complexities. Rather, these file systems view files as a raw byte sequence. Specifically, files are split or otherwise separated into blocks or extents which are then stored on an underlying data storage device. This approach simplifies file system design, but at the same time misses significant opportunities for improving file system management efficiency.

SUMMARY

The embodiments described herein comprise a system, computer program product, and method for storage management of complex files.

In one aspect a computer system is provided with a hardware processor operatively coupled to memory, and a multi-tier storage array operatively coupled to the processor. A decompose engine is provided and operatively coupled to the processor and the storage array. The decompose engine functions to assess a received file and attend to its decomposition. More specifically, in response to receipt of a complex file, the decompose engine parses the file into one or more logical objects, each logical object having a distinct characteristic. Each logical object is matched to a storage tier in the storage array, and more specifically, assigned to a tier based on one or more object characteristics. The logical object is stored in the matched storage tier in a decomposed format. An index and a per-file mapping are created or utilized to record an associated identification of every logical object and map every file to a set of logical objects. The decompose engine places the identified logical object to the assigned tier within the storage array, records the object placement in the index, and updates corresponding mapping.

In another aspect, a computer program product is provided to support read and write requests of a multi-object file. The computer program product comprises a computer readable storage device having program code embodied therewith, the program code executable by a processing unit. More specifically, program code responds to receipt of a complex file and parses the file into two or more logical objects. Each logical object has an associated or inherent characteristic. Program code matches each of the logical objects to a storage tier in a multi-tier storage array. More specifically, program code assigns each logical object to a tier based on one or more object characteristics in a decomposed format and records identification of each logical object in an associated index. Accordingly, program code places the identified logical object to the assigned tier within the storage array and records the placement in the index.

In yet another aspect, a method is provided for processing complex files. More specifically, a received complex file is decomposed into two or more logical objects, each logical object having a distinct characteristic. Each of the logical objects is matched to a storage tier in a multi-tier storage array based on their associated characteristic and in a decomposed format. In addition, an index is created and identification of each logical object and placement of the identified logical object within the storage array is recorded in the index.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A file system is the way in which files are named and mapped to where they are placed logically for storage and retrieval. Data in the file system may be read, modified, and stored. There are two classes of transactions that are related to the data—a read request and a write request. A read request relates to a request for a file in support of an application. For example, an application executing on a client machine may request a file from a server to support a transaction. A write request relates to a request to store a file in support of an application. For example an application executing on a client machine may modify an existing file or create a new file, and may request the server to store the file on an associated storage device.

Based on awareness of the different file formats, the file system can transparently decompose files into smaller logical objects, and manage these objects based on associated object characteristics. Decomposition may include, but is not limited to, identifying the following aspects of a file: expected size, access pattern, bandwidth and latency requirements, and probability of being accessed by multiple clients. Accordingly, files and associated file management may be optimized based on file system recognition of the different file formats.

Figure 1:
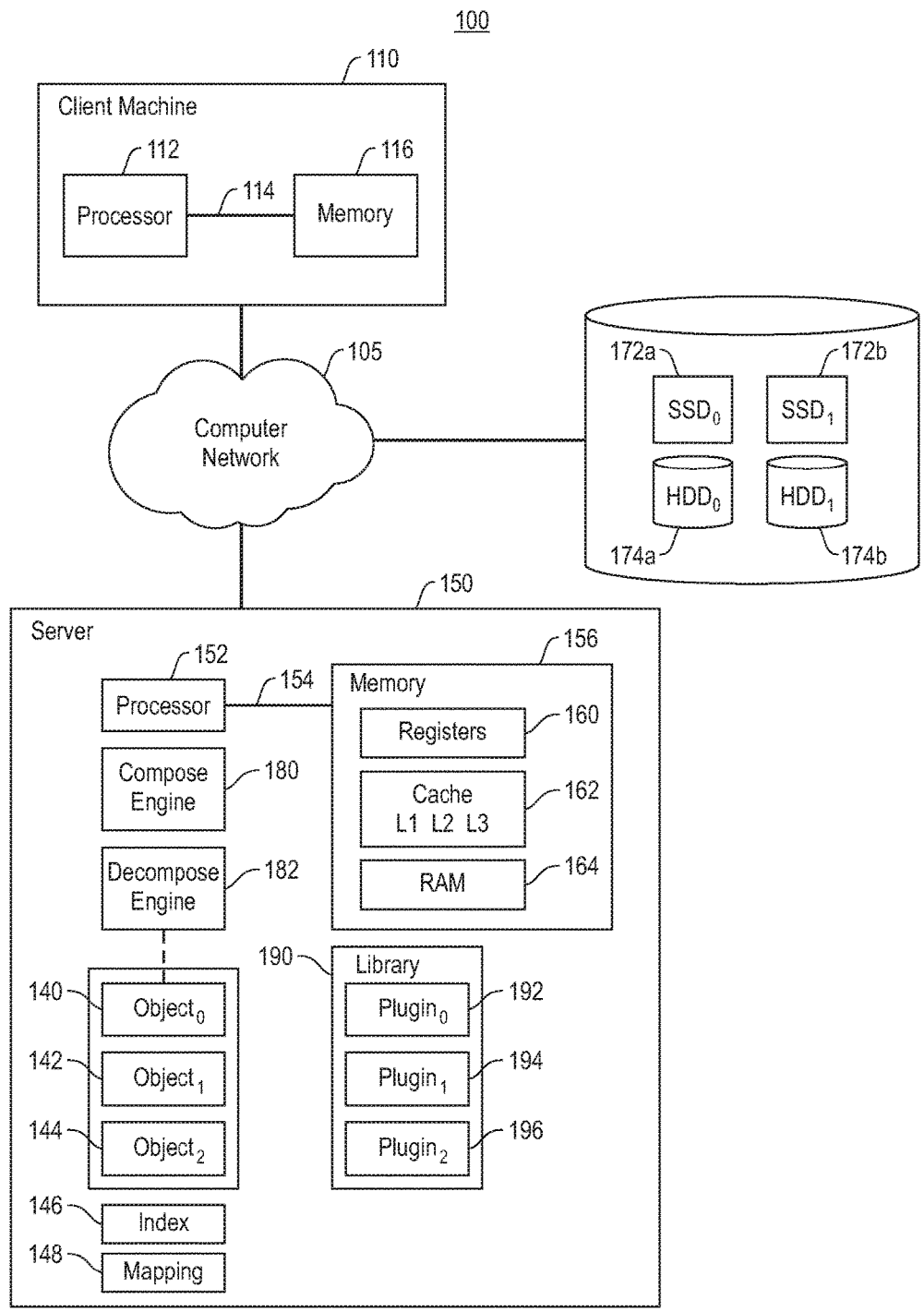
FIG. 1 depicts a block diagram illustrating an example of a computer system that supports and enables the file decomposition and associated reassembly.

Tools and associated methods are described in detail to address complex files, and management of these files. The tools support decomposition of the complex file into smaller logical objects and storage of the logical objects. At the same time, the tools support automatic reassembly of the file from the logical objects. Referring to FIG. 1, a block diagram (100) is provided illustrating a computer system that supports and enables the file decomposition and associated reassembly. As shown, a client machine (110) is provided in communication with a server (150) across a network connection (105). The client machine (110) is a computer connected to the network (105) with access to the server (150). As shown, the client machine (110) is configured with a processing unit (112) in communication with memory (116) across a bus (114). Similarly, the server (150) is configured with a processing unit (152) in communication with memory (156) across a bus (154). The server (150) functions to process read and write requests received from the client machine (110).

The server (150) is in communication with data storage (170) across the network connection (105). In the example shown herein, there are two classes of storage devices in data storage (170) including one or more solid state drives, SSD, and one or more hard disk drives, HDD. Although only two solid state drives, $SSD_0$ (172a) and $SSD_1$ (172b) and two hard disk drives, $HDD_0$ (174a) and $HDD_1$ (174b) are shown, this quantity should not be considered limiting. In addition, memory (156) is shown with three classes of storage, including registers (160), cache (162), RAM (164). Each of the storage devices (172a), (172b), (174a), and (174b), and the classes of memory storage (160), (162), and (164) represents different tools in a storage array. In one embodiment, the storage tools are organized into a hierarchy, with each tool classified onto a separate tier in the hierarchy. Details of the storage hierarchy are shown and described in detail in FIG. 2. Accordingly, the storage array is operatively coupled to the processing unit (152).

The server (150) is configured with a compose engine (180), a decompose engine (182), and an associated library (190). More specifically, the library (190) includes a plurality of plugins (192), (194), and (196). Each plugin supports single or multiple different file formats (e.g., UNIX tarballs, VMWare VMDK files, AVI multi-media containers). Although only three plugins are shown herein, this quantity is for illustrative purposes and should not be considered limiting. In one embodiment, the library (190) and the associated plugins (192)-(196) are provided in communication with the server (150) across network connection (105). Upon receipt of a complex file (not shown), the decompose engine (182) presents or otherwise submits the file to the library (190). In one embodiment, the decompose engine (182) ascertains if there is a plugin present in the library that supports the file format. Similarly, in another embodiment, the plugins receive the file from the engine (182) and detect and decompose the file based on the file format. For example, in one embodiment, $plugin_0$ (192) detects and decomposes files in MP format, $plugin_1$ (194) detects and decomposes files in TAR format, and $plugin_2$ (196) detect and decomposes files in another format. In one embodiment, the library (190) is configured for a separate plugin for every file format. Each plugin should be capable of recognizing a supported file format. In one embodiment, file formats may be recognized by an extension or by an associated file header. Similarly, in one embodiment, one plugin may call one or more additional plugins recursively to further decompose the file. Details of the recursive decomposition are described below with respect to a layered object. Objects that cannot be decomposed further are considered atomic. Accordingly, the input for decomposition is the complete file, while the output is the set of logical objects that constitute the file.

In the example shown herein, three logical objects are created from the decomposed file—$object_0$ (140), $object_1$ (142), and $object_2$ (144). The quantity of logical objects shown herein is not limiting, and in one embodiment includes a larger or smaller quantity of logical objects. Accordingly, the decompose engine (182) functions as a conduit to the library (190) to enable the plugins to appropriately decompose the received file into one or more logical objects.

Following the decomposition of the file, the decompose engine (182) functions to match each of the logical objects (140)-(144) to one of the storage devices. As shown in detail in FIG. 2, the storage devices are arranged in a hierarchy, and as such, the decompose engine (182) assigns each logical object to a device in a select tier in the array of storage devices, also referred to herein as a storage array. In one embodiment, the decompose engine (182) evaluates characteristics of each of the decomposed logical objects and assigns them to a storage device based on the evaluated characteristics and user policy. For example, video objects from a TAR file may be placed in the HDD based tier that provides necessary sequential throughput, while database objects from the same TAR file are directed to an SSD based tier with fast random access. In addition, an index (146) is provided and the decompose engine (182) records each logical object and the associated storage location of the logical object in the index (146). Furthermore, a per-file mapping (148) is maintained to track all objects constituting the file.

Figure 4:
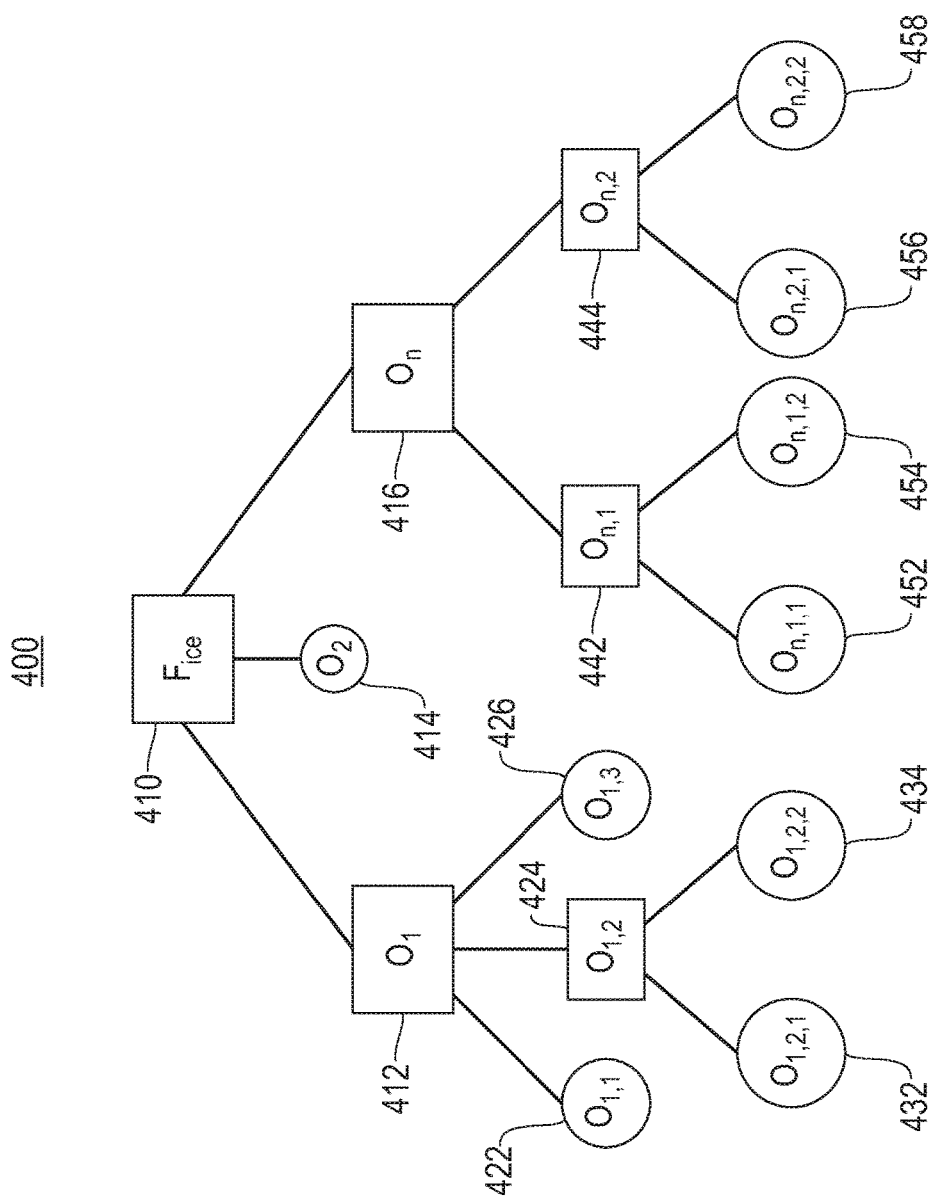
FIG. 4 depicts a block diagram illustrating a hierarchical tree representation of a complex file.
Figure 5A:
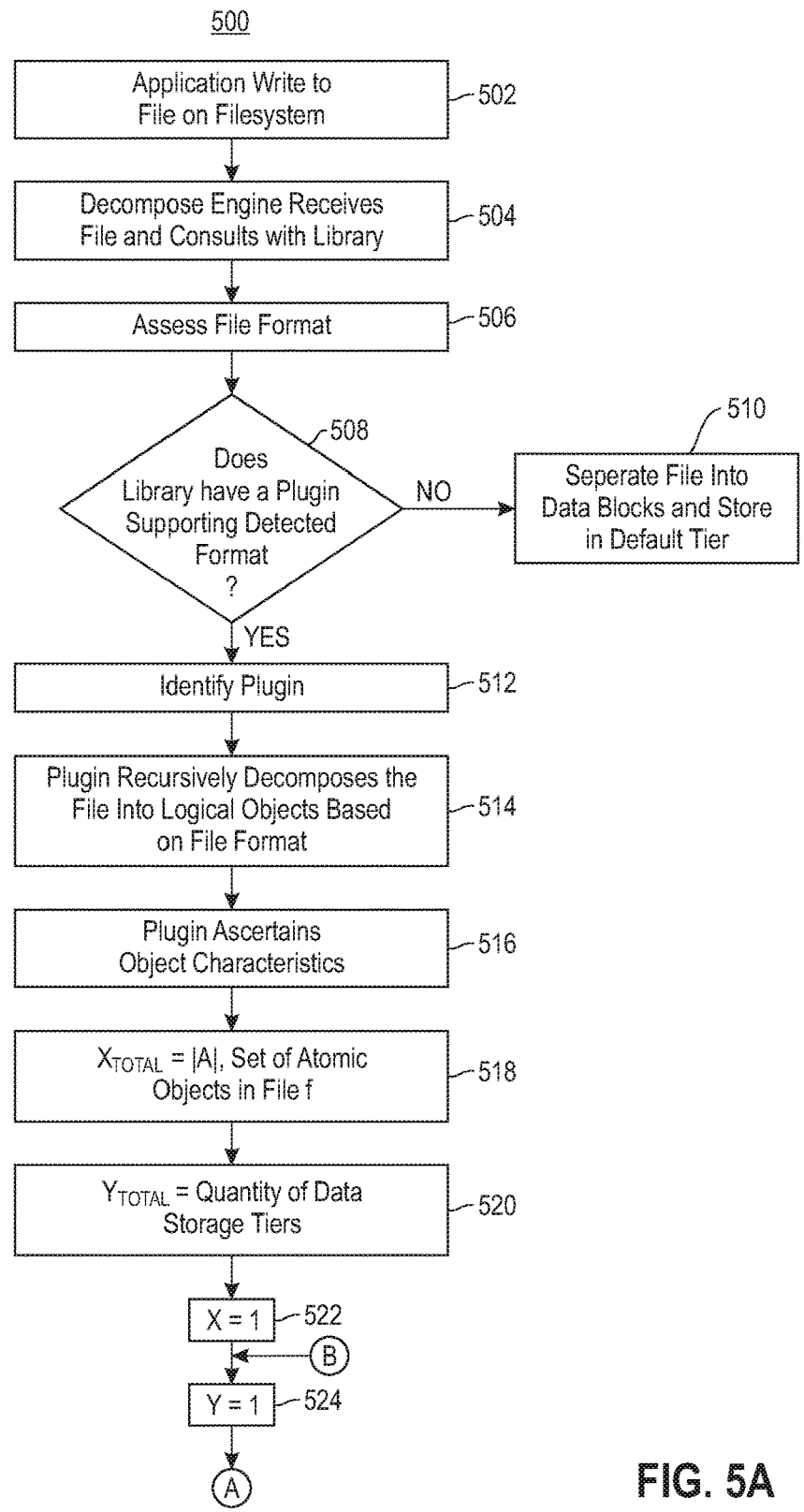
FIGS. 5A and 5B depicts a flow chart illustrating process for decomposing files into logical objects when new files are created and stored or existing files are extended or modified and matching resulting objects to appropriate tiers accessible in the system.
Figure 5B:
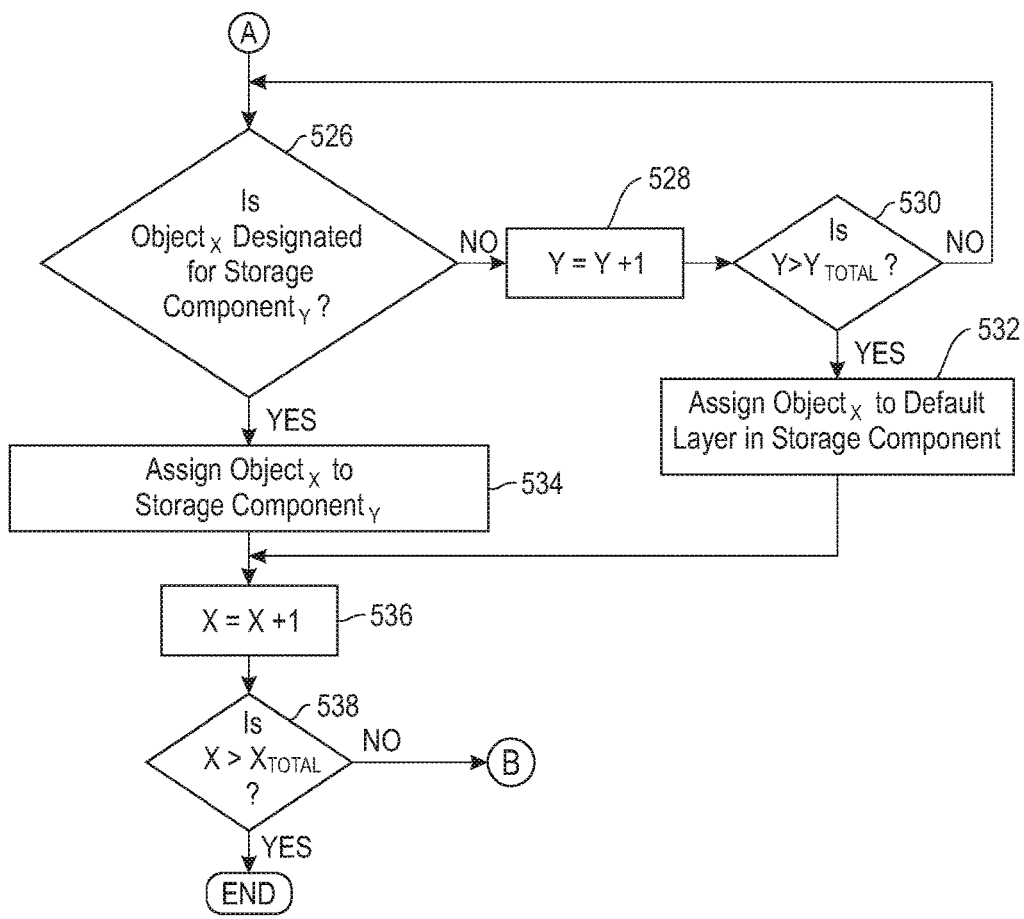

In addition to the decompose engine (182) in support of a write request, a compose engine (180) is provided in support of a read request. The compose engine (180) functions to reassemble the logical objects into the file. In one embodiment, the compose engine (180) introduces each of the logical objects into memory (156) and concatenates the objects into the file in support of the read request. In one embodiment, the compose engine (180) utilizes a mapping and an index, created during the file decomposition to locate the logical objects. The compose engine (180) employs the plugins located in the library (190) to compose the file, e.g. concatenate the logical object, from the atomic objects. Similar to the decomposition, the composition of the file may be done recursively. FIGS. 4, and 5A and 5B described below address the details of the concatenation and reassembly. Accordingly, the compose engine (180) functions to re-assemble the logical components, or select portions of one or more of the logical components.

A storage array is a hardware element that contains a plurality of storage devices. The array is commonly configured with a storage controller to manage the storage devices within the array. Applications are known to store their data as files. The storage array can be one dimensional with a single category of storage devices, or in one embodiment multi-dimensional, also referred to herein as a tiered storage solution with multiple types of storage, e.g. persistentRAM, SSD, HDD, and Tape. More specifically, tiered storage directs data to a storage media within the storage array based on performance, availability, and recovery requirements.

Figure 2:
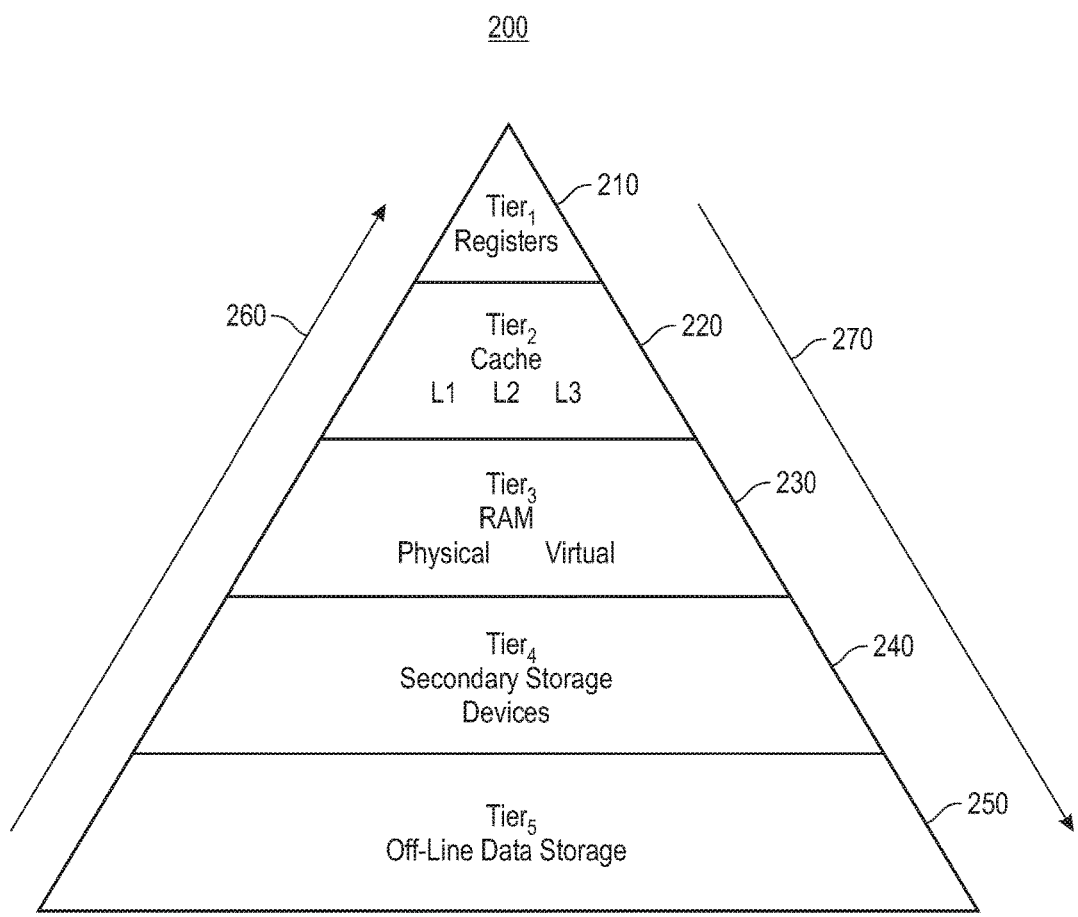
FIG. 2 depicts a block diagram illustrating a hierarchical structure of a storage system.

Referring to FIG. 2, a block diagram (200) is provided illustrating a hierarchical structure of a storage system. As shown in this example, there are five tiers (210), (220), (230), (240), and (250). $Tier_1$ (210) represents processor registers. $Tier_2$ (220) represents cache, including L1, L2, and L3. $Tier_3$ (230) represents main memory RAM, including physical RAM and virtual memory. $Tier_4$ (240) represents secondary storage devices, such as a hard disk drive (HDD) and removable storage. $Tier_5$ (250) represents off-line data storage. In the example shown herein, only five tiers are described in detail. The embodiments should not be limited to the quantity of tiers shown and described. In one embodiment, the hierarchical structure may include a fewer or greater quantity of tiers, with each tier representing a class of storage components. Speed with respect to accessing data is the fastest on $Tier_1$ (210), and continues to steadily decrease from $Tier_2$ (220) to $Tier_5$ (250). With respect to cost, $Tier_5$ (250) is the least expensive, with the costs increasing at a relatively steady rate from $Tier_5$ (250) to $Tier_1$ (210). A faster access time is obtained by moving up the hierarchy, as represented by (260), while larger storage capacity and lower costs are obtained by moving down the hierarchy, as represented by (270). Processor storage components, shown in $Tier_1$ (210), generally have the fastest access times, the smallest storage capacity, and the highest cost. Accordingly, as represented, different groups of storage devices all store data differently with the amount of data that they can store being different and how fast they store the data also being different. Furthermore, different tiers can perform better or worse depending on the application access pattern. For example, HDD-based tiers perform exceptionally well for large sequential writes and SSD-based tiers are most suitable for small random reads.

Storage types are organized into the hierarchy shown with each device designated to a tier based on associated storage device characteristics, such as expense, performance, and reliability. In one embodiment, the storage hierarchy distinguishes each tier in the hierarchy by response time. For example, small objects with synchronous access, e.g. metadata, can be placed in low-latency storage, and objects with frequent overwrites can be placed in cache. Data that is the subject of a write request is placed in data storage, and selection of an appropriate storage tier is relatively complex. For example, data that is shared may be accessed from multiple processing nodes and, as such, placement needs to consider both local and remote accesses and associated costs. Similarly, compressibility characteristics need to be considered for data objects that are likely to be subject to compression. With respect to compressibility, text and image data may be subject to different compression rates. A file with a higher compressibility may be stored in a storage layer that supports compression. Similarly, with respect to de-duplication, it is understood that objects that have a high probability to de-duplicate against each other can be stored together in a content-addressable storage (CAS) layer. In addition, separate optimizations may take place during both the read and write requests to enhance performance or provide new functionalities. For example, write requests can effectively index logical data objects to speed up future user searches and read requests automatically audit logical object accesses.

Figure 3:
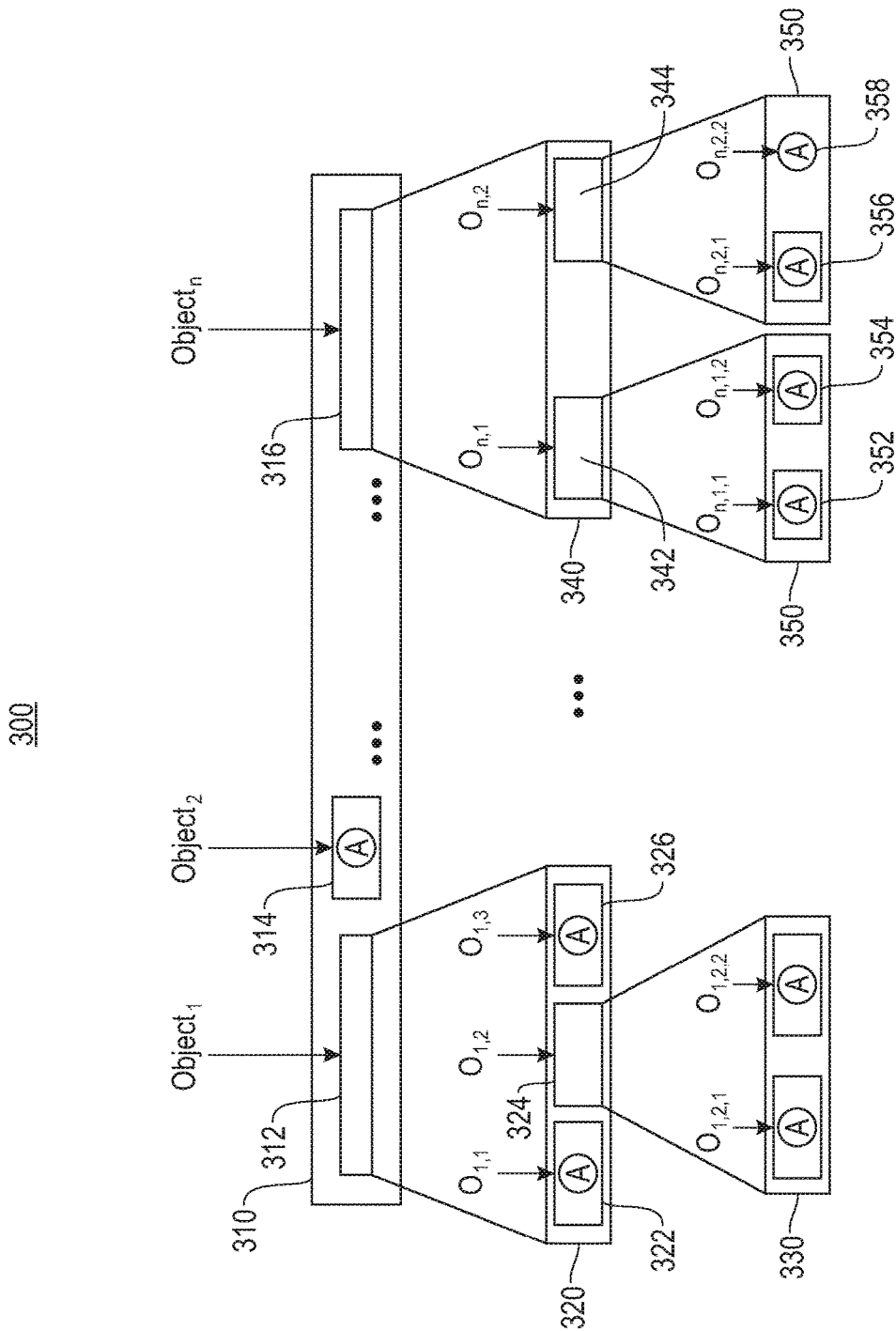
FIG. 3 depicts a block diagram illustrating a hierarchical representation of a complex file.

Referring to FIG. 3, a block diagram (300) is provided illustrating a hierarchical representation of a complex file composed of one or more layered objects. As shown, a file (310) is shown composed of multiple objects, including $object_1$ (312), $object_2$ (314), and $object_N$ (316). Each object may be a layered object or an atomic object. As described above, a layered object is an object that can be de-composed into two or more objects, and an atomic object is an object that cannot be further decomposed. In the example shown herein, $object_1$ (312) and $object_N$ (316) are layered objects, and $object_2$ (314) is an atomic object. A first tier (320) shows a further de-composition of layered $object_1$ (312) with multiple objects, including $object_{1,1}$ (322), $object_{1,2}$ (324), and $object_{1,3}$ (326). As shown in this example, $object_{1,1}$ (322) and $object_{1,3}$ (326) are both atomic, and $object_{1,2}$ (324) is a layered object that may be further de-composed. A second tier (330) shows a further de-composition of layered object, $object_{1,2}$ (324), composed of $object_{1,2,1}$ (332) and $object_{1,2,2}$ (334), both shown herein as atomic objects. Similarly, $object_N$ (316) is shown as a layered object, with the first tier (340) showing a de-composition into two objects, $object_{N,1}$ (342) and $object_{N,2}$ (344), both which are shown as layered objects. A second tier (350) demonstrates further de-composition of the layered objects of the first tier (340). As shown, $object_{N,1}$ (342) is composed of $object_{N,1,1}$ (352) and $object_{N,1,2}$ (354), and $object_{N,2}$ (344) is composed of $object_{N,2,1}$ (356) and $object_{N,22}$ (358). Each of the objects of the second tier (350) are shown herein as atomic. Accordingly, an object may be an atomic object, subject to a single layer, of subject to multiple layers.

Referring to FIG. 4, a block diagram (400) is provided illustrating a hierarchical tree representation of a complex file composed of one or more layered objects. As shown, a file (410) is shown as a complex object composed of multiple objects, $object_1$ (412), $object_2$ (414) and $object_N$ (416). $Object_1$ (412) and $object_N$ (416) are shown herein as complex objects, and as such are layered objects that may be subject to further de-composition, and $object_2$ (414) is an atomic object. $Object_1$ (412) is shown as composed of three objects, including $object_{1,1}$ (422), $object_{1,2}$ (424), and $object_{1,3}$ (426). Both $object_{1,1}$ (422) and $object_{1,3}$ (426) are shown herein as atomic objects, and $object_{1,2}$ (424) is shown as a complex object. Further de-composition of $object_{1,2}$ (424) shows that it is composed of two objects, including $object_{1,2,1}$ (432) and $object_{1,2,2}$ (434), both shown herein as atomic objects. Similarly, $object_N$ (416) is shown as a complex object that is shown composed of two objects, $object_{N,1}$ (442) and $object_{N,2}$ (444), both shown herein as complex objects. As shown, $object_{N,1}$ (442) is de-composed into two objects, $object_{N,1,1}$ (452) and $object_{N,1,2}$ (454), and $object_{N,2}$ (444) is de-composed into two objects $object_{N,2,1}$ (456) and $object_{N,2,2}$ (458). Accordingly, a complex file may be represented in a tree format showing the de-composition of the objects therein.

Referring to FIGS. 5A and 5B, a flow chart (500) is provided illustrating a process for decomposing files into logical objects when new files are created and stored or existing files are extended or modified. File decomposition can be performed online or offline. With respect to inline decomposition, every time a file is created or updated, the decomposition of the file happens immediately. In contrast, with respect to offline decomposition, files are first written to the underlying storage without decomposition, and then later a background thread scans the file system, decomposes the file(s) into objects, and stores the file(s) in a decompressed format. The process shown in FIGS. 5A and 5B depicts online file decomposition.

As shown, an application writes a file to the file system (502). The file is received by a decompose engine (504) which consults with an associated decomposition library. More specifically, the decomposition library maintains a set of plugins for supported file formats. The decomposition engine performs an initial evaluation of the file, which in one embodiment is an assessment of the file format (506), and determines if there is a plugin in the library that supports the detected format (508). In one embodiment, the plugin is capable of recognizing the supported file format. A negative response to the determination at step (508) is followed by separating the file into data blocks and storing the data blocks in a default tier in the multi-tier storage system (510). However, a positive response to the determination at step (508) is followed by identifying the supporting plugin (512), which then decomposes the file into two or more logical objects based on the file format (514). In one embodiment, the de-composition at step (514) is a recursive process. Details of the de-composition are shown and described in FIG. 6.

Figure 6:
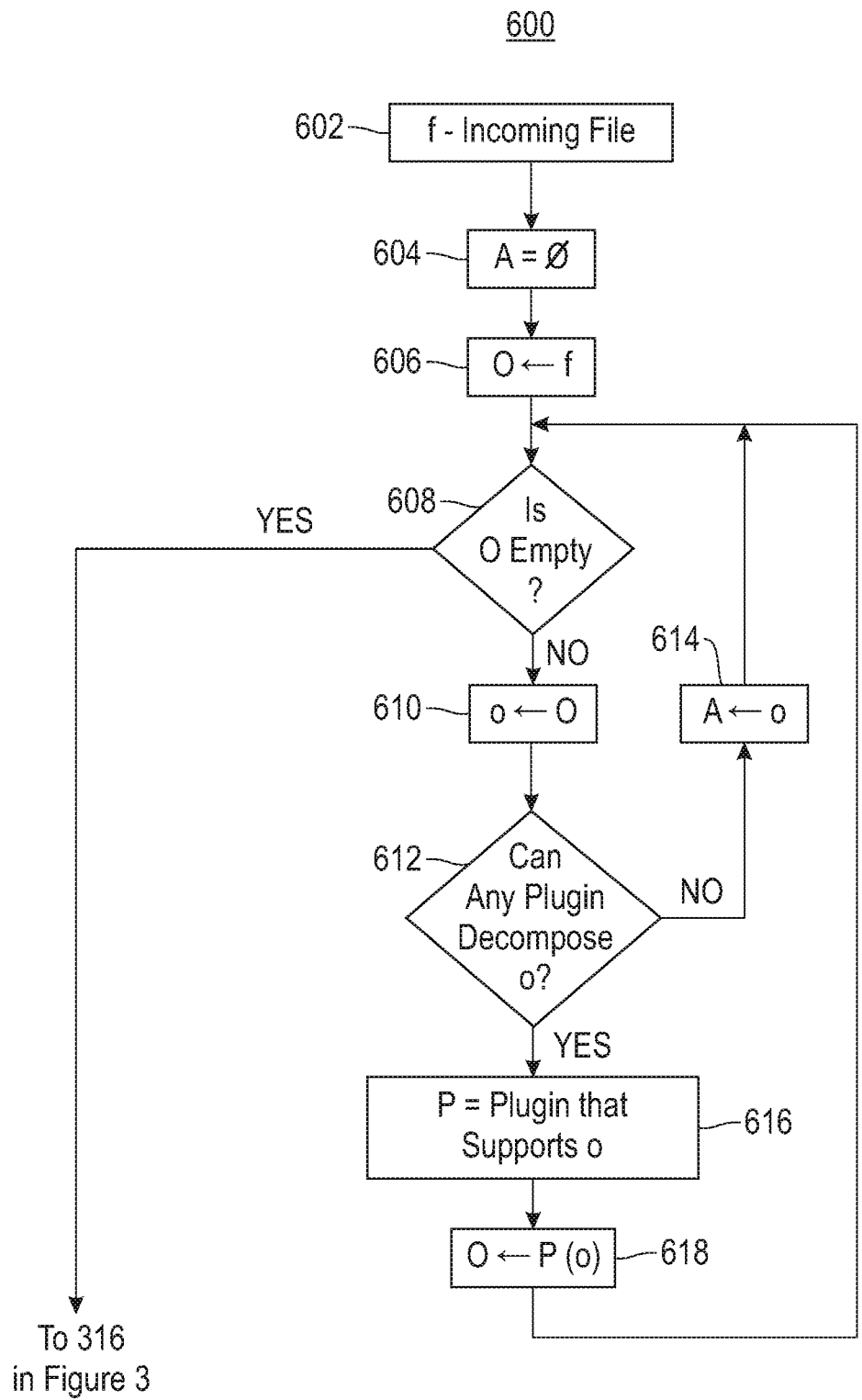
FIG. 6 depicts a flow chart illustrating recursive decomposition of a complex file and associated objects.

Referring to FIG. 6, a flow chart (600) is provided illustrating recursive decomposition of a complex file and associated objects. As shown, an incoming file, f, is received (602) and a set of atomic objects, A, in the file is initialized as empty (604). Similarly, the variable O represents a set of objects in the file that have not been subject to de-composition (606). It is then determined if the set of objects, O, is empty (608). An empty set determination is followed by a return to step (516) in FIGS. 5A and 5B since it has been determined that the set of atomic objects in the file, f, contains all leaf object, i.e., atomic objects. However, a negative response to the determination at step (606) is followed by picking (and removing) object o from the set of objects, O, (610) and determining if there is a plugin available to de-compose the object o (612). A negative response at step (612) is followed by addition of the object o to a set of atomic objects A (614) and a return to step (608). A positive response to the determination at step (612) is followed by identifying the plugin(s) that support object o (616), executing the plugin to decompose the object o (618) and adding the results of decomposition to set 0 (618), followed by a return to step (608). Accordingly, as shown herein a plugin is identified and assigned to each non-atomic object so that at the end of the algorithm, set A contains all atomic objects in file f.

Instead of streaming the file into bytes, the plugin detects one or more logical objects within the file so that the logical objects may be placed in storage with respect to their size, access pattern, bandwidth and latency requirements, and potential of being shared. For example a video file may be composed of a low-bitrate audio stream and a high-bitrate image stream, each represented as separate logical objects, and which may be placed in separate areas of data storage in an associated heterogeneous storage system. Accordingly, the function of the decomposition and associated plugin is to dissect the subject file into multiple logical objects.

Following step (514), the plugin ascertains characteristics of the identified logical objects (516). It is understood that the identified logical object may be a single level object, or in one embodiment, a multi-level object, which includes a second level logical object embedded. For example, if a TAR archive contains (among other files) a VMDK file, then decomposing VMDK represents a second level of decomposition. The file decomposition shown herein accommodates and identifies multi-level objects and proceeds to match the objects to storage performance. As shown, the variable $X_{Total}$ is assigned to the size of set A, which is shown and described in FIG. 6 as the set of atomic objects in file f (518) and the variable $Y_{Total}$ is assigned to the quantity of tiers in the data storage (520), with each tier having associated storage performance characteristics. An associated object counting variable, X, is initialized (522).

Based on the characteristics of the object, it is then determined if logical $object_X$, is designated for storage $component_Y$ (526). A negative response to the determination at step (526) is followed by an increment of the storage tier counting variable (528) and a subsequent determination as to whether each of the available storage tiers have been evaluated for the subject object (530). If the response to the determination at step (530) is negative, the process returns to step (526), and if the response at step (530) is positive, $object_X$ is assigned to the default layer in the storage system (532). However, if the response at step (526) is positive, $object_X$ is assigned to storage $component_Y$ (534). Following step (534), the object counting variable, X, is incremented (536), and it is determined if all of the logical objects have been assessed and assigned to a storage component (538). A negative response to the determination at step (538) is followed by a return to step (524), and a positive response concludes the logical object assignment to data storage.

As shown in FIGS. 5A and 5B, logical objects are evaluated and matched to a storage component based on characteristics of the objects. In one embodiment, the evaluation of a storage component includes evaluation of system workload and employing the workload as a characteristic in the assignment to a storage component. For example, in one embodiment, the workload evaluation may encompass evaluation of the object size, a data type access pattern, bandwidth and latency requirements, sharing characteristics, etc. In addition to object evaluation, one consideration is searching for the logical objects in support of a subsequent read request. A searchable index may be created during the process of writing the logical objects to a storage component. The index may be associated with a tier, or with the storage hierarchy as an entity.

Figure 7:
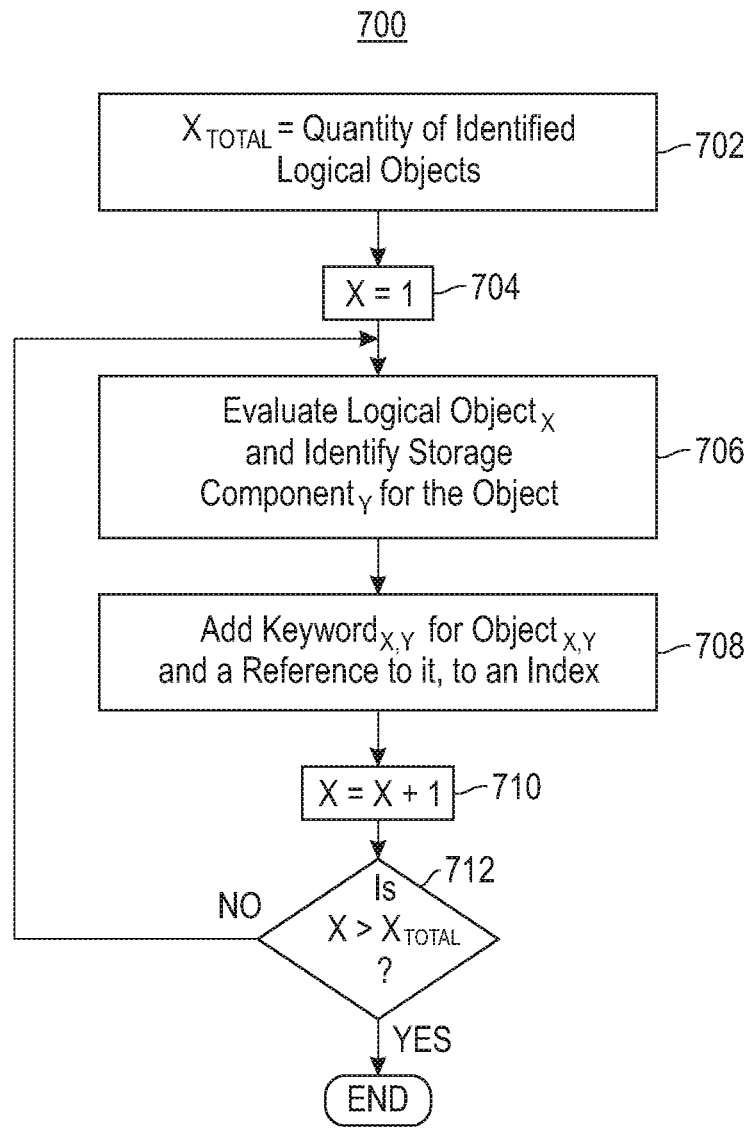
FIG. 7 depicts a flow chart illustrating a flow chart for creating and maintaining a searchable index during the write process.

Referring to FIG. 7, a flow chart (700) is provided illustrating a flow chart for creating and maintaining a searchable index during the write process shown in FIGS. 5A and 5B. As shown in FIGS. 5A and 5B, the logical objects are identified, including any embedded objects, and the tiers of the storage hierarchy are also identified. The variable $X_{Total}$ is assigned to the quantity of logical objects identified during the object parsing process (702), and an associated logical object counting variable is initialized (704). As logical object$_X$ is evaluated and an associated storage component$_Y$ for the object is identified (706), a keyword$_{X,Y}$ for the object$_{X,Y}$ and a reference to it is added to an index (708). Though keyword$_{X,Y}$ can be anything, in many practical scenarios a Keywordx,y is derived from the object itself. For example, if the object is an audio stream, then several samples of the stream can be used as a keyword to quickly locate similarly sounding streams in the system. Following step (708), the object counting variable is incremented (710), and it is determined if all of the objects have been assigned to an associated storage component, together with an index entry (712). A negative response to the determination is followed by a return to step (706), and a positive response concludes the indexing of the logical objects. In one embodiment, the process of indexing the objects takes place during the write process. The index is a searchable component. By associating the keyword in the index with the object and the tier, the search of the index may be supported by keyword across all of the storage tiers, or in one embodiment, limited to a designated tier.

As shown in FIGS. 5A and 5B, and FIG. 7, plugins are employed to evaluate identified objects and to store the objects in a tiered storage system accordingly to object characteristics. For example, in one embodiment, the logical object may be identified as a frequently accessed object, and as such is placed in flash memory, e.g., a high tier in the hierarchy. This placement enables the object to be read faster in comparison with magnetic or remote storage. Similarly, in one embodiment, performance is enhanced in the read path shown by limiting the read to a portion of the object necessary to support the associated read transaction, and does not include aspects of the object that are not necessary. Accordingly, optimizations may be employed to enhance performance and efficiency of the read request.

File metadata is created with respect to the identification and storage of data objects in the storage hierarchy. In one embodiment, the file metadata is reflected in a file associated inode. The file metadata contains a mapping (recipe) that lists the logical objects and location of these objects. In one embodiment, file metadata is updated for each logical object and the associated data storage assignment. Accordingly, each file subject to the write path shown in FIG. 3 includes metadata that functions as a mapping (recipe) for identifying the logical object(s) and storage of these objects, to support and enable a future read request.

Figure 8:
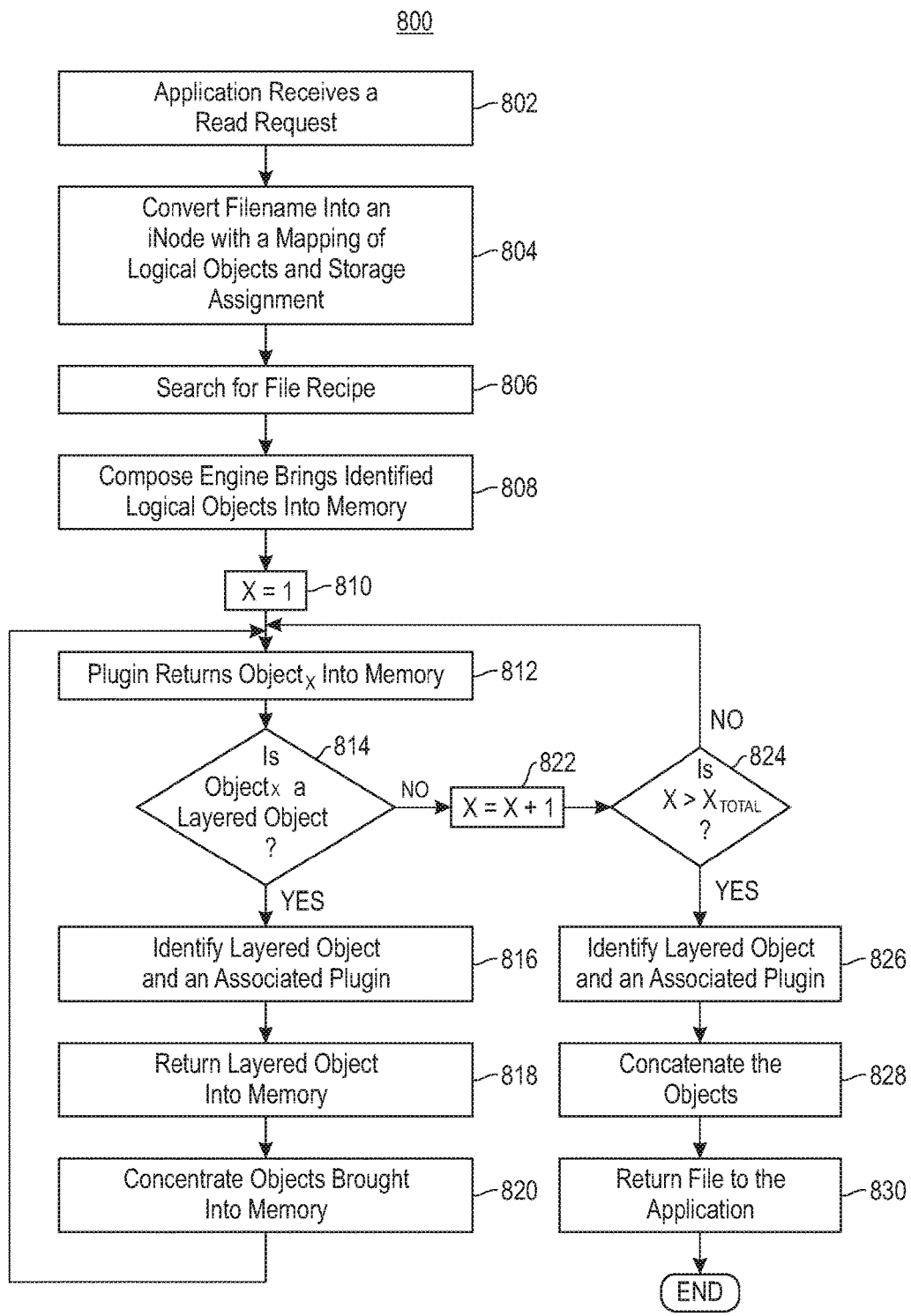
FIG. 8 depicts a flow chart illustrating a read path for a file that has been subject to decomposition.

As shown and described in FIGS. 5A and 5B, data is placed in a select tier within the hierarchy to match latency and bandwidth requirements. It is understood that a file that has been the subject of a write request, may be the subject of a future read request. With reference to FIG. 8, a flow chart (800) is provided illustrating a read path for a file that has been subject to decomposition, as shown and described in FIGS. 5A and 5B. A read request for a file is received by an application (802). In one embodiment, and as shown herein, a filename associated with the file is converted into an associated inode which includes a mapping (recipe) of the logical objects and associated storage assignment (804). Following step (804) a search for the object recipe is conducted (806) since the inode may also include an identification of associated plugins that compose the logical objects. As shown in FIG. 3, in one embodiment, one or more of the logical objects may be layered. For example, during the write process, the plugin in the decomposition library may identify a second logical object embedded within a first logical object. Layering of objects is reflected in the inode structure, e.g. file metadata. In one embodiment, the access patterns and semantic relationships may be ascertained at either step (804) or (806). Access patterns may be recognized based on information about semantic relationships between object types. Then, on access to an arbitrary object, semantically related objects may be pre-fetched in cache, e.g. when an inode of a file is accessed, there may be a high probability that a corresponding file will be request.

Following step (806), a compose engine is employed to bring the logical objects identified in the file metadata into memory (808). The compose engine is in communication with an associated composition library that stores the supported plugins for the logical objects. As described in FIGS. 5A and 5B, the counting variable X pertains to the logical objects, and the counting variable Y pertains to the storage hierarchy tiers. The object counting variable is initialized (810), and an associated plugin returns object$_X$ into memory (812). It is also determined if object$_X$ is a layered object (814). A positive response to the determination at step (814) is followed by identifying the layered object within the object and an associated plugin (816), which then returns the layered object into memory (818). With respect to layered and non-layered components of the object, the associated plugin(s) concatenates the objects that are brought into memory (820). Following step (820), the process returns to step (812) to search for further layering of the logical objects. Following a negative response to the determination at step (814), the object counting variable is incremented (822), and it is determined if all of the objects have been assessed and returned from memory (824). A negative response to the determination a step (824) is followed by a return to step (812). However, a positive response is followed by identifying the layered object within the object and an associated plugin (826), concatenating the objects (828), and returning the file to the application that is the subject of the read request (830). Satisfying the read request effectively reassembles the file, or select portions of the file. In one embodiment, the reassembly takes place transparently. Accordingly, plugins employed for the write process are called for the read process to identify and locate the associated objects and to bring the objects into memory from their respective storage tiers to satisfy the read request.

Aspects of the tools, e.g. engines, and their associated functionality may be embodied in a computer system/server in a single location, or in one embodiment, may be configured in a cloud based system sharing computing resources. With references to FIG. 9, a block diagram (900) is provided illustrating an example of a computer system/server (902), hereinafter referred to as a host (902) of a cloud based support system, to implement the processes described above with respect to FIGS. 3-8. Host (902) is operational with numerous other general purpose or special purpose computing system environments or configurations. Examples of well-known computing systems, environments, and/or configurations that may be suitable for use with host (902)

include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (902) may be described in the general context of computer system-executable instructions, such as program modules, being executed by a computer system. Generally, program modules may include routines, programs, objects, components, logic, data structures, and so on that perform particular tasks or implement particular abstract data types. Host (902) may be practiced in distributed cloud computing environments where tasks are performed by remote processing devices that are linked through a communications network. In a distributed cloud computing environment, program modules may be located in both local and remote computer system storage media including memory storage devices.

Figure 9:
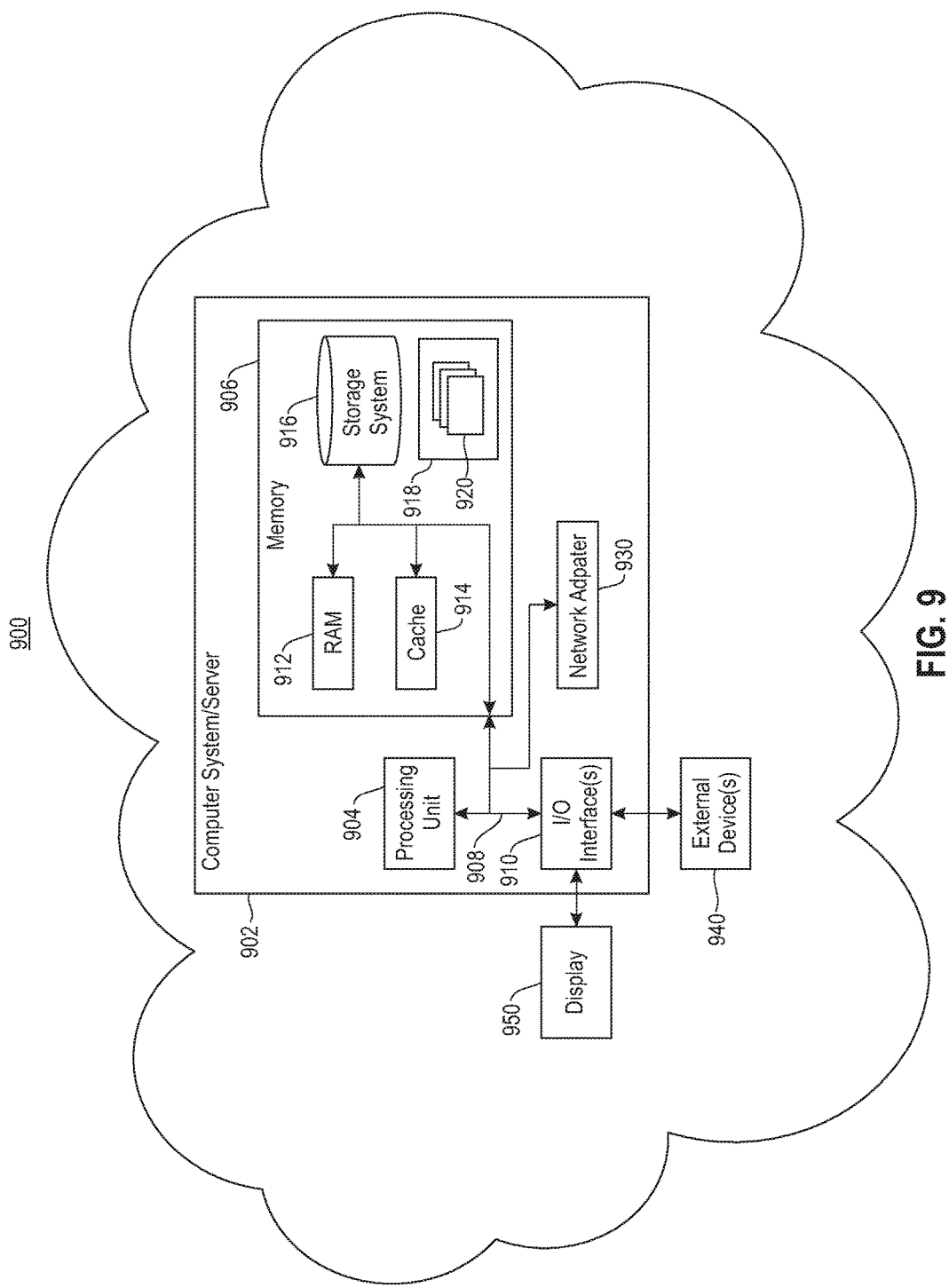
FIG. 9 depicts a schematic example of a system to implement the process shown and described in FIGS. 3-8.

As shown in FIG. 9, host (902) is shown in the form of a general-purpose computing device. The components of host (902) may include, but are not limited to, one or more processors or processing units (904), a system memory (906), and a bus (908) that couples various system components including system memory (906) to processor (904). Bus (908) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (902) typically includes a variety of computer system readable media. Such media may be any available media that is accessible by host (902) and it includes both volatile and non-volatile media, removable and non-removable media.

Memory (906) can include computer system readable media in the form of volatile memory, such as random access memory (RAM) (912) and/or cache memory (914). By way of example only, storage system (916) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (908) by one or more data media interfaces.

Program/utility (918), having a set (at least one) of program modules (920), may be stored in memory (906) by way of example, and not limitation, as well as an operating system, one or more application programs, other program modules, and program data. Each of the operating systems, one or more application programs, other program modules, and program data or some combination thereof, may include an implementation of a networking environment. Program modules (920) generally carry out the functions and/or methodologies of embodiments of file decomposition and associated reassembly as described herein. For example, the set of program modules (920) may include the modules configured to implement the online and offline decomposition into logical objects and associated concatenation described above with reference to FIGS. 1-8.

Host (902) may also communicate with one or more external devices (940), such as a keyboard, a pointing device, etc.; a display (950); one or more devices that enable a user to interact with host (902); and/or any devices (e.g., network card, modem, etc.) that enable host (902) to communicate with one or more other computing devices. Such communication can occur via Input/Output (I/O) interface(s) (910). Still yet, host (902) can communicate with one or more networks such as a local area network (LAN), a general wide area network (WAN), and/or a public network (e.g., the Internet) via network adapter (930). As depicted, network adapter (930) communicates with the other components of host (902) via bus (908). In one embodiment, a plurality of nodes of a distributed file system (not shown) is in communication with the host (902) via the I/O interface (910) or via the network adapter (930). It should be understood that although not shown, other hardware and/or software components could be used in conjunction with host (902). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (906), including RAM (912), cache (914), and storage system (916), such as a removable storage drive and a hard disk installed in a hard disk drive.

Computer programs (also called computer control logic) are stored in memory (906). Computer programs may also be received via a communication interface, such as network adapter (930). Such computer programs, when run, enable the computer system to perform the features of the present embodiments as discussed herein. In particular, the computer programs, when run, enable the processing unit (904) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (902) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
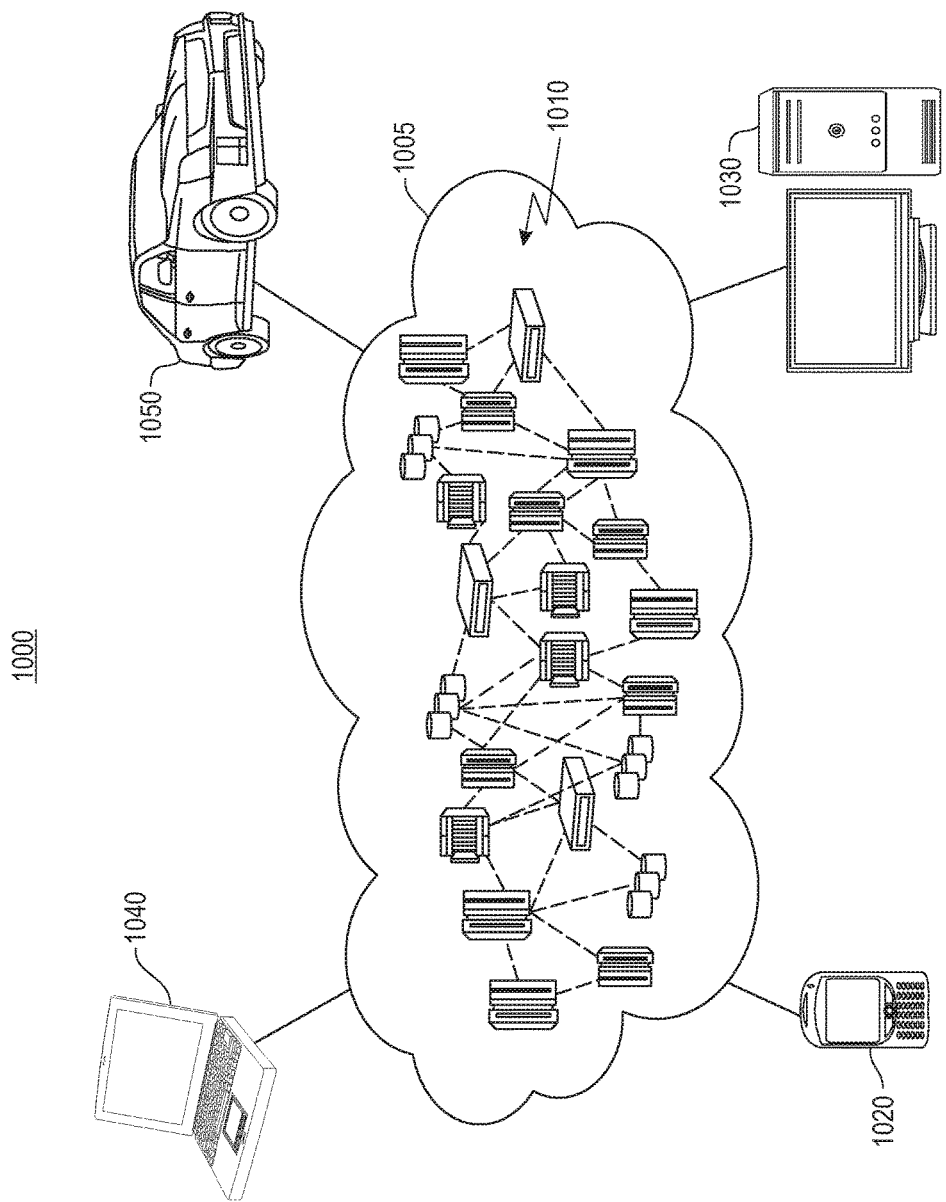
FIG. 10 depicts a block diagram illustrating a cloud computing environment.

Referring now to FIG. 10, an illustrative cloud computing network (1000). As shown, cloud computing network (1000) includes a cloud computing environment (1005) having one or more cloud computing nodes (1010) with which local computing devices used by cloud consumers may communicate. Examples of these local computing devices include, but are not limited to, personal digital assistant (PDA) or cellular telephone (1020), desktop computer (1030), laptop computer (1040), and/or automobile computer system (1050). Individual nodes within nodes (1010) may further communicate with one another. They may be grouped (not shown) physically or virtually, in one or more networks, such as Private, Community, Public, or Hybrid clouds as described hereinabove, or a combination thereof. This allows cloud computing environment (1000) to offer infrastructure, platforms and/or software as services for which a cloud consumer does not need to maintain resources on a local computing device. It is understood that the types of computing devices (1020)-(1050) shown in FIG. 10 are intended to be illustrative only and that the cloud computing environment (1005) can communicate with any type of computerized device over any type of network and/or network addressable connection (e.g., using a web browser).

Figure 11:
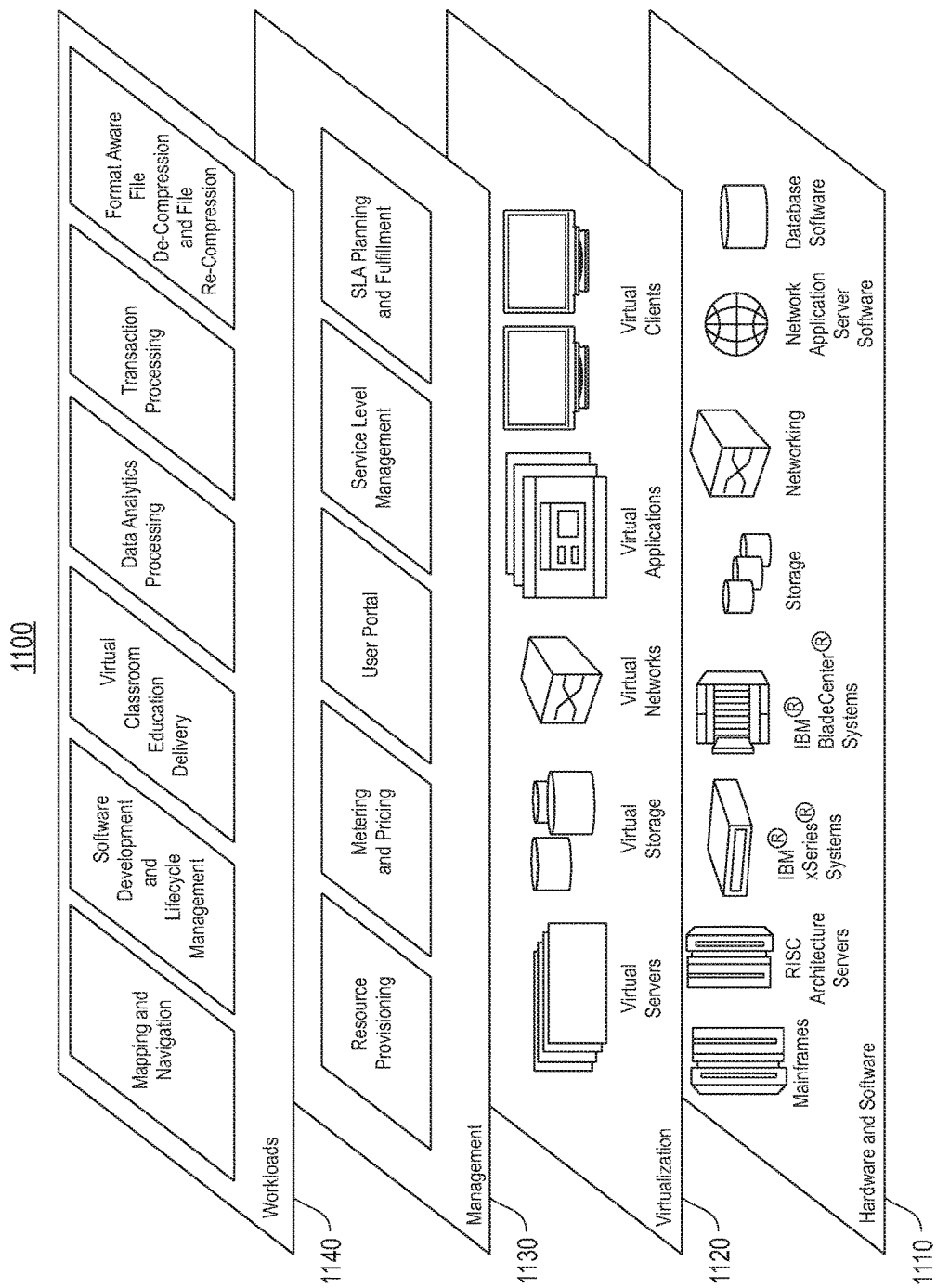
FIG. 11 depicts a block diagram illustrating a set of functional abstraction model layers provided by the cloud computing environment.

Referring now to FIG. 11, a set of functional abstraction layers provided by the cloud computing network of FIG. 9 is shown. It should be understood in advance that the components, layers, and functions shown in FIG. 11 are intended to be illustrative only, and the embodiments are not limited thereto. As depicted, the following layers and corresponding functions are provided: hardware and software layer (1110), virtualization layer (1120), management layer (1130), and workload layer (1140). The hardware and software layer (1110) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1120) provides an abstraction layer from which the following examples of virtual entities may be provided: virtual servers; virtual storage; virtual networks, including virtual private networks; virtual applications and operating systems; and virtual clients.

In one example, management layer (1130) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (1140) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and format-aware file de-composition and file re-composition within the cloud computing environment.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the embodiments with various modifications as are suited to the particular use contemplated. Accordingly, the decomposition and associated file composition recognizes multiple file formats at a file system layer and efficiently utilizes the characteristics of the associated storage array.

It will be appreciated that, although specific embodiments have been described herein for purposes of illustration, various modifications may be made without departing from the spirit and scope of the embodiments. Accordingly, the scope of protection of these embodiments is limited only by the following claims and their equivalents.

What is claimed is:

1. A computer system comprising:
    a hardware processor operatively coupled to memory;
    a multi-tier storage array operatively coupled to the processor;
    a decompose engine operatively coupled to the processor and the storage array, the decompose engine to:
        receive a complex file;
        decompose the received complex file including parse the file into two or more logical objects at least partially based on a file format of the file, each logical object having a distinct characteristic;
        match each of the logical objects to a storage tier in the storage array; and
        assign each logical object to a tier based on one or more object characteristics in the matched storage tier in a decomposed format; and
    an index to record an identification of each logical object and a mapping to map the file to a set of logical objects; and
    the decompose engine to place the identified logical object to the assigned tier within the storage array, records the placement in the index, and updates the mapping.

2. The system of claim 1, wherein the decompose engine identifies a data type access pattern of at least one of the logical objects, and further comprising the decompose engine to match at least one logical object to an associated storage tier based on a characteristic selected from the group consisting of: workload and storage performance.

3. The system of claim 1, wherein the decomposition of the complex file employs two or more plugins to recognize supported file formats, and further comprising a first plugin to recursively call a second plugin to further decompose the file.

4. The system of claim 1, further comprising the hardware processor to receive a read request for the complex file, and the compose engine to transparently reassemble the file from the previously parsed logical objects, the compose engine to employ the mapping and the index.

5. The system of claim 4, wherein the reassembly of the file further comprising the compose engine to introduce each of the logical objects into memory and concatenate the logical objects to satisfy the read request.

6. The system of claim 5, wherein the introduction into memory is limited to a portion of the logical object.

7. The system of claim 1, wherein:
    a complex file includes two or more logical objects selected from the group consisting of: layered logical objects and atomic logical objects; and
    parsing the file into the one or more logical objects comprises decomposing the two or more logical objects into a hierarchical tree structure until each logical object in the tree structure is an atomic logical object.

8. A computer program product for supporting read and write requests of a multi-object file, the computer program product comprising a computer readable storage device having program code embodied therewith, the program code executable by a processing unit to:
    receive a complex file;
    decompose the received complex file including parse the file into two or more logical objects at least partially based on a file format of the file, each logical object having a distinct characteristic;
    match each of the logical objects to a storage tier in a multi-tier storage array;
    assign each logical object to a tier based on one or more object characteristics in the matched storage tier in a decomposed format;
    record identification and mapping of each logical object in an index; and
    place the identified logical object to the assigned tier within the storage array and to record the placement in the index.

9. The computer program product of claim 8, further comprising program code to identify a data type access pattern of at least one of the logical objects, and match the at least one logical object to an associated storage tier based on a characteristic selected from the group consisting of: workload and storage performance.

10. The computer program product of claim 8, further comprising program code to employ two or more plugins to recognize supported file formats, and further comprising a first plugin to recursively call a second plugin to further decompose the file.

11. The computer program product of claim 8, further comprising program code to receive a read request for the complex file, and transparently reassemble the file from the parsed logical objects.

12. The computer program product of claim 11, wherein the reassembly of the file further comprising program code to introduce each of the logical objects into memory and concatenate the logical objects to satisfy the read request.

13. The computer program product of claim 12, wherein the introduction into memory is limited to a portion of the logical object.

14. A method comprising:
    decomposing a complex file into two or more logical objects at least partially based on a file format of the complex file, each logical object having a distinct characteristic;
    matching each of the logical objects to a storage tier in a multi-tier storage array; and
    storing each logical object with respect to their associated characteristic in the matched storage tier within the storage array in a decomposed format, including creating an index recording identification of each logical object and placement of the identified logical object within the storage array.

15. The method of claim 14, further comprising receiving a write request for the complex file, decomposing the file into two or more logical objects, matching each of the logical objects to a storage tier responsive to an associated object characteristics, and storing each of the logical objects in a storage device within the matched storage tier.

16. The method of claim 15, wherein the file decomposition includes identifying a data type access pattern of at least one of the logical objects, and further comprising matching the at least one logical object to an associated storage tier based on a characteristic selected from the group consisting of: workload and storage performance.

17. The method of claim 14, wherein the decomposition of the complex file employs two or more plugins for recognizing supported file formats, and further comprising a first plugin recursively calling a second plugin to further decompose the file.

18. The method of claim 14, further comprising receiving a read request for the complex file, and transparently reassembling the file from the decomposed logical objects.

19. The method of claim 18, wherein the reassembling of the file further comprising introducing each of the logical objects into memory and concatenating the logical objects to satisfy the read request.

20. The method of claim 19, wherein the introduction into memory is limited to a portion of the logical object.

* * * * *